United States Patent
Nicolas et al.

(10) Patent No.: US 10,850,988 B2
(45) Date of Patent: Dec. 1, 2020

(54) PROCESS FOR SYNTHESIZING ZEOLITE CRYSTALS WITH SEEDING AGENT

(71) Applicant: Arkema France, Colombes (FR)

(72) Inventors: Serge Nicolas, Lons (FR); Cécile Lutz, Gan (FR); Yvan Lecomte, Arthezde de Béarn (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/493,583

(22) PCT Filed: Mar. 12, 2018

(86) PCT No.: PCT/FR2018/050569
§ 371 (c)(1),
(2) Date: Sep. 12, 2019

(87) PCT Pub. No.: WO2018/167415
PCT Pub. Date: Sep. 20, 2018

(65) Prior Publication Data
US 2020/0216325 A1  Jul. 9, 2020

(30) Foreign Application Priority Data
Mar. 17, 2017 (FR) .................... 17 52197

(51) Int. Cl.
*C01B 39/22* (2006.01)
*B01J 37/10* (2006.01)
*B01J 29/08* (2006.01)

(52) U.S. Cl.
CPC ............ *C01B 39/22* (2013.01); *B01J 29/082* (2013.01); *B01J 37/10* (2013.01)

(58) Field of Classification Search
CPC .......... C01B 39/22; B01J 29/082; B01J 37/10
See application file for complete search history.

(56) References Cited

U.S. PATENT DOCUMENTS

| | | |
|---|---|---|
| 4,314,979 A | 2/1982 | Deabriges |
| 4,661,334 A | 4/1987 | Latourette et al. |
| 5,993,773 A * | 11/1999 | Funakoshi .............. C01B 39/22 423/709 |
| 6,306,363 B1 * | 10/2001 | Funakoshi .............. C01B 39/22 423/710 |
| 9,061,918 B2 | 6/2015 | Bouvier et al. |
| 2010/0304140 A1 * | 12/2010 | Bouvier .................. B01J 20/18 428/402 |

FOREIGN PATENT DOCUMENTS

| | | |
|---|---|---|
| BE | 869156 A | 1/1979 |
| CN | 102107881 A | 6/2011 |
| EP | 0149929 A1 | 7/1985 |
| EP | 0922673 A1 | 6/1999 |
| EP | 0960854 A1 | 12/1999 |
| EP | 2244976 B1 | 2/2017 |

OTHER PUBLICATIONS

Bian et al, Generalized high-temperature synthesis of zeolite catalysts with unpredictably high space-time yields (STYs), J. Mater. Chem. A 2017, 5, 2613-2618 (Year: 2017).*

Masoudian et al , "Synthesis and Characterization of high aluminum zeolite X from technical grade materials", Bullletin of Chemical Reaction Engineering and Catalysis, 8(1), 54-620 (2013) (Year: 2013).*

Nishi et al, "Synthesis of Classical Zeolites" Handbook of Porous Solids, vol. 2 (2002) (Year: 2002).*

Qiang et al , "Influence of synthesis parameters on the crystallini8ty and Si/Al ratio of NaY zeolite synthesized from Kaolin", Pet. Sci . (2010)7: 403-409 (Year: 2010).*

International Search Report and Written Opinion for International Application No. PCT/FR2018/050569, dated May 9, 2018, 12 pages.

Breck, Zeolite Molecular Sieves, Structure, Chemistry and Use, "Kinetics and Mechanism of Zeolite Crystallization",1974, pp. 334-335.

Breck, Zeolite Molecular Sieves, Structure, Chemistry and Use, "Zeolites From Aluminosilicate Gels of Alkali Metals",1974, p. 273.

* cited by examiner

*Primary Examiner* — David M Brunsman
(74) *Attorney, Agent, or Firm* — RatnerPrestia

(57) ABSTRACT

The present invention relates to process for synthesizing zeolite X crystals comprising at least one step of adding seeding agent(s) into a synthesis gel and at least one step of forming zeolite X crystals at a temperature strictly greater than 120° C., preferably equal to or greater than 130° C.

10 Claims, No Drawings

PROCESS FOR SYNTHESIZING ZEOLITE CRYSTALS WITH SEEDING AGENT

CROSS-REFERENCE TO RELATED APPLICATIONS

This is the national phase of International Application No. PCT/FR2018/050569, filed 12 Mar. 2018, which claims priority to French Application No. 1752197, filed 17 Mar. 2017. The disclosure of each of these applications is incorporated herein by reference in its entirety for all purposes.

FIELD

The present invention relates to the field of zeolites, more precisely the field of the industrial synthesis of zeolite crystals and more particularly that of the synthesis of FAU X-type zeolite crystals.

BACKGROUND

The synthesis of FAU X-type zeolite (or more simply zeolite X in the remainder of the present document) is carried out conventionally in industry in a stirred batch reactor, with heating of the reaction medium by injection of steam and/or by a heating jacket.

The preparation of the synthesis gel enabling the formation of zeolite crystals commonly consists in mixing a sodium aluminate solution with a sodium silicate solution, it being possible for this mixing to be carried out either in equipment upstream of the crystallization reactor or directly in the crystallization reactor.

In the case of zeolite X, which is a metastable crystalline phase, it is known to necessarily carry out a low-temperature maturing phase, generally below 40° C., to form seed crystals that will give, by the growth thereof, zeolite X crystals after the crystallization phase carried out at higher temperature.

On the other hand, the preparation of zeolite X at higher temperature may lead to the formation of other crystalline forms, such as zeolite P and zeolite A, as taught, for example, in the book "Zeolite Molecular Sieves" by D. W. Breck, (1974), page 273, published by John Wiley & Sons, New York.

However, document EP0149929 discloses a process for obtaining a zeolite, in particular a zeolite A, by continuous feeding of an aqueous sodium silicate solution and of an aqueous sodium aluminate solution into an unstirred tubular reactor, such that the mixing time is less than the gelling time.

Patent BE869156 describes an industrial process for the continuous production of zeolite A which consists firstly in instantaneously preparing a gel, with a turbomixer and continuously, from a sodium silicate solution and a sodium aluminate solution, at temperatures of between 40° C. and 90° C. The gel thus prepared continuously is then transferred into crystallization tanks for heating to between 70° C. and 100° C. in order to carry out the crystallization in batch mode.

With the aim of substantially reducing the synthesis times, it could be particularly beneficial to work at higher temperatures than the customary temperatures conventionally used for the synthesis of zeolite X crystals, and thus be able to envisage even more profitable industrial syntheses, and very particularly continuous industrial syntheses, of zeolite X crystals.

However, as taught in the publication "Zeolite Molecular Sieves", ibid., zeolite X crystallizes at between 25° C. and 120° C., with variable crystallization times which are shorter the higher the crystallization temperature is; see, for example "Zeolite Molecular Sieves" by D. W. Breck, (1974), pp. 333-334, published by John Wiley & Sons, New York.

Thus, a first aim of the present invention consists in proposing a synthesis of zeolite X crystals, and more particularly a continuous synthesis of zeolite X crystals. Another aim consists in proposing a synthesis, typically a continuous synthesis, of zeolite X crystals with formation of high-purity crystals, for example with a crystallinity equal to or greater than 98% and a purity equal to or greater than 98%. Yet another aim consists in proposing a synthesis, typically a continuous synthesis, of zeolite X crystals with formation of high-purity crystals, with a reduced synthesis duration, in particular reduced compared to that known in the prior art.

The applicant has now discovered, unexpectedly, that by carrying out seeding by adding seeding agent(s) into the synthesis gel, it is possible to form zeolite X crystals at a temperature greater than 120° C. while drastically reducing the synthesis time for the zeolite X crystals. In addition, the zeolite X crystals obtained under these conditions have an entirely satisfactory degree of crystallinity, commonly greater than 98%, more precisely between 98% and 100%.

Without wishing to be bound by theory, it has been observed that the addition of seeding agent(s) into the synthesis gel makes it possible to do away with the maturing phase which is generally carried out at low temperature. Under these conditions, it is therefore possible to envisage introducing, into the synthesis reactor, reagents brought to a temperature greater than the temperature normally required for the maturing phase, which is typically at most 40° C. Introducing hot reagents, typically at a temperature greater than 40° C., makes it possible to further reduce the overall synthesis time.

Thus, a first subject of the present invention is a process for synthesizing zeolite X crystals, said process comprising at least one step of adding seeding agent(s) into a synthesis gel and at least one step of forming zeolite X crystals at a temperature (crystallization temperature) strictly greater than 120° C., preferably equal to or greater than 130° C.

SUMMARY

More precisely, the process of the present invention for synthesizing zeolite X crystals comprises at least the following steps:
a) preparing a synthesis gel by mixing at least one source of silica, at least one source of alumina and optionally, but preferably, at least one aqueous alkali or alkaline-earth metal hydroxide solution,
b) mixing said synthesis gel with at least one seeding agent in order to obtain a reaction medium,
c) introducing the reaction medium into the reactor,
d) carrying out the crystallization reaction at a temperature greater than 120° C.,
e) filtering the reaction medium in order to recover the zeolite X crystals produced.

DETAILED DESCRIPTION

The synthesis gel mixed in step b) with at least one seeding agent is typically the synthesis gel obtained in step a) of the process of the present invention.

According to one embodiment, the crystallization temperature of the process of the present invention is equal to or less than 200° C., better still equal to or less than 160° C. According to a preferred aspect, the crystallization temperature (Tc) of the process of the present invention is such that 120° C.<Tc≤200° C., preferably 130° C.≤Tc≤160° C.

According to a preferred embodiment of the invention, the temperature (Tr) of the reagents (synthesis gel and seeding agent(s)) introduced into the crystallization reactor is equal to or greater than 50° C., preferably equal to or greater than 60° C., more preferably equal to or greater than 70° C.

According to a very particularly preferred embodiment of the process of the present invention, the difference between the crystallization temperature and the temperature of the reagents (Tc−Tr) is between 0° C. and 100° C., limits included, preferably between 0° C. and 75° C., limits included, more preferably between 0° C. and 50° C., limits included.

In this preferred embodiment, the reagents are introduced at a temperature at most equal to the crystallization temperature, which has the immediate advantage of reducing the synthesis time.

It should be understood that the reaction medium may optionally be preheated before introduction into the reactor. In this case, the reaction medium may be preheated to a temperature at most equal to the crystallization temperature.

It should also be understood that, according to a preferred embodiment, the step a) of the process of the present invention relates to the preparation of a synthesis gel by mixing a source of silica with a source of alumina and optionally but preferably an aqueous alkali or alkaline-earth metal hydroxide solution.

According to yet another preferred embodiment, the step b) of the process of the present invention relates to the mixing of the synthesis gel obtained in step a) with a seeding agent in order to obtain a reaction medium.

The process of the present invention makes it possible especially to synthesize zeolite X crystals having a purity equal to or greater than 98%, and preferably of between 98% and 100%, along with relatively short synthesis durations, that is to say that are shorter than the crystallization times customarily observed in the prior art. This reduction in the duration of crystal formation is obtained especially by virtue of the crystallization step, carried out at a temperature strictly greater than 120° C., or even equal to or greater than 130° C., as indicated above.

The great advantage of being able to carry out this crystallization step at a temperature strictly greater than 120° C. is the speed of synthesis of zeolite X crystals.

The zeolites, crystals of which may be prepared by virtue of the process of the present invention, are zeolites X, that is to say zeolites having an Si/Al atomic ratio of between 1.00 and 1.45, preferably between 1.05 and 1.45, more preferably between 1.10 and 1.45, very preferably between 1.10 and 1.30, limits included.

The synthesis gel may be any type of composition well known to a person skilled in the art which leads to the formation of zeolite X and typically comprises at least one source of silica and at least one source of alumina and optionally, but preferably, at least one aqueous alkali or alkaline-earth metal hydroxide solution, preferably alkali metal hydroxide solution, typically sodium hydroxide solution, and/or organic structuring agents (structure-directing agents or templates).

A source of silica is understood to mean any source well known to a person skilled in the art and in particular a solution, preferably an aqueous solution, of silicate, in particular of alkali or alkaline-earth metal silicate, for example of sodium silicate, or of colloidal silica.

A source of alumina is understood to mean any source of alumina well known to a person skilled in the art and in particular a solution, preferably an aqueous solution, of aluminate, in particular of alkali or alkaline-earth metal aluminate, for example of sodium aluminate.

The concentrations of the various solutions of silica and alumina are adapted depending on the nature of the source of silica, of the source of alumina, the respective proportions of the sources of alumina and of silica to which the alkali or alkaline-earth metal hydroxide solution and/or one or more organic structuring agents are added, according to the knowledge of a person skilled in the art.

The synthesis gel from step a) is prepared as described above by mixing sources of silica and alumina in a basic medium. This mixing is advantageously carried out in a rotor-stator shear mixer, that is to say a shear mixer comprising a rotor that rotates at high speed and that makes the mixture pass through a stator, the geometry of which may vary.

The degree of shear is defined by the shear rate $\gamma$ in $s^{-1}$ which is equal to the tip speed of the rotor divided by the thickness of the gap between the rotor and the stator. The tip speed $V_p$ is calculated from the speed of rotation $V_r$ and from the diameter of the rotor d according to the equation: $V_p = V_r \pi d_r$ (expressed in $m \cdot s^{-1}$), where $V_r$ is the speed of rotation expressed in $rev \cdot s^{-1}$, $d_r$ is the diameter of the rotor (expressed in m) and $\gamma$ is equal to $V_p/e$, where e represents the distance of the gap between the rotor and the stator (expressed in m).

The shear rate generally applied is between $10\,000\ s^{-1}$ and $200\,000\ s^{-1}$, preferably between $10\,000\ s^{-1}$ and $100\,000\ s^{-1}$.

A seeding agent is understood to mean a solution or a suspension, in liquid form or in gel form, of a solid or a liquid that promotes the orientation of the synthesis towards the desired zeolite. Such solids and liquids that promote the orientation of the synthesis towards the desired zeolite are well known to a person skilled in the art and are for example chosen from nucleating gels, zeolite crystals, mineral particles of any nature, etc., and also mixtures thereof.

According to a preferred aspect, the seeding agent is a nucleating gel, and more preferably still, said nucleating gel comprises a homogeneous mixture of a source of silica (for example sodium silicate), a source of alumina (for example alumina trihydrate), optionally but advantageously a strong mineral base, such as, for example, sodium hydroxide, potassium hydroxide or calcium hydroxide to mention but the main ones and the ones most commonly used, and water. One or more structure-directing agents, typically organic structure-directing agents, may also optionally be introduced into the nucleating gel.

The seeding agent(s) may be mixed with the synthesis gel according to any technique well known to a person skilled in the art and preferably using a static mixer, which has the advantage of promoting the homogenization of said mixture.

The respective proportions of synthesis gel and of seeding agent(s) may vary to large extents, the total amount of seeding agent(s) added in the process of the present invention representing between 0.005% and 10% by weight relative to the synthesis gel, preferably between 0.01% and 5% and more preferably between 0.01% and 3% by weight relative to the synthesis gel.

As indicated above, the process according to the present invention may be carried out from reagents heated beforehand to a temperature greater than 50° C., preferably greater than 60° C., more preferably greater than 70° C. The advantage of this is a gain in the energy expended in the overall process, since the energy supplied to heat the starting reagents serves in part to heat the synthesis gel and/or the reaction medium to carry out the crystallization.

The crystallization reaction may be carried out under pressure, for example under autogenous pressure, under atmospheric pressure, or more generally under any pressure, typically between atmospheric pressure and 1.5 MPa.

The reactor is fed with the synthesis gel by any suitable means known to a person skilled in the art for transferring a fluid, for example by gravity flow, by siphoning or by pumping. The flow rates of the synthesis gel at the inlet of the reactor may be monitored according to any means known to a person skilled in the art and preferably by means of pumps, optionally combined with flow regulators.

The synthesis gel, before and/or after mixing with the seeding agent(s), may be heated by any suitable means known to a person skilled in the art, for example by means of heat exchangers, heating by a heating jacket, injection of steam, microwaves, etc., to name but a few means among those well known in the field.

At the end of the crystallization reaction, the reaction medium is filtered (step e)) in order to separate the crystals produced on the one hand and the mother liquors on the other hand. This filtration may be carried out according to any method well known to a person skilled in the art, and for example by one or more methods chosen from centrifugation, filter press filtration, belt filter filtration, rotary filter filtration, etc.

The crystals obtained at the end of step e) may optionally be subjected to one or more conventional treatments well known to a person skilled in the art, such as washing, cation exchange, drying, impregnation, activation, etc., it being possible for this or these treatment(s) to be carried out in batch mode or continuously, advantageously continuously. For example, the crystals obtained may be subjected to one or more washes with water, so as to eliminate the residual mother liquors that might still be present.

The crystals obtained may also be dried, according to the conventional techniques for drying zeolite crystals, for example at temperatures between 40° C. and 150° C., for a duration that may vary between several minutes and several hours, typically between several minutes and 10 hours. The drying operation at a temperature below 40° C. could prove to be much longer and thus economically unprofitable, whereas a drying temperature above 150° C. could result in a greater or lesser deterioration of the still wet zeolite crystals.

After drying, the zeolite crystals may be used as is, but they are advantageously activated, here too according to conventional activation techniques well known to a person skilled in the art, for example at temperatures between 150° C. and 800° C., for a duration that varies from several minutes to several hours, and typically from several minutes to 10 hours.

The mother liquors resulting from the filtration step e) may advantageously be recycled. One of the advantages of this recycling is that of thus enabling the reduction in the consumption of sodium hydroxide by introducing the mother liquors directly into the reaction medium or into the silicate solution or else into the aluminate solution (typically that are respectively the sources of silica and of alumina in step a) of the process), but it may also enable a substantial reduction in energy consumption, thereby making it possible to further improve the overall energy efficiency. Before being recycled, the mother liquors may optionally have undergone one or more treatments chosen from ultrafiltration, reconcentration, distillation, etc.

The process of the present invention may be carried out continuously or semi-continuously. In this case, the reaction medium is prepared continuously by means of a shear mixer operating in continuous mode, into which the seeding agent(s) is (are) added continuously to seed the synthesis gel. For a continuous process of this type, the crystallization is generally carried out in a tubular reactor provided with an oscillatory device. In the case of a semi-continuous process, the crystallization may be carried out in batch mode in a stirred or unstirred, preferably stirred, reactor.

As a variant, the process of the present invention may be carried out in batch mode, and in this case the synthesis gel is prepared with strong stirring by adding the silicate into the aluminate contained in a reactor, then a dose of seeding agent(s) is added into the synthesis gel to obtain a reaction medium. The crystallization of said reaction medium may be carried out either with stirring or without stirring, since the short duration of the crystallization enables this. It is nonetheless possible to stir the contents of the reactor at the end of crystallization, in order to resuspend the crystals and facilitate emptying of the reactor.

Indeed, and as indicated above, carrying out the crystallization step at a temperature greater than 120° C., whereas conventional syntheses recommend working at most at a temperature of approximately 100° C., makes it possible to significantly reduce the duration of crystallization of the zeolite X.

As indicated above, when the temperature of the reagents introduced is greater than 70° C. and when seeding with at least one seeding agent is carried out, it is possible to obtain, most surprisingly, zeolite X crystals with a crystallinity greater than 98%, more specifically of between 98% and 100%, and of purity greater than 98%, more specifically of between 98% and 100%.

The degree of crystallinity, and also the purity of the zeolite synthesized are evaluated by x-ray diffraction analysis, a technique known to a person skilled in the art under the acronym XRD. This identification is for example carried out on a Bruker XRD machine.

This analysis makes it possible not only to determine the amount of crystalline phase(s) present, but also to identify and quantify the possible different zeolites present, each of the zeolites having a unique diffractogram defined by the positioning of the diffraction peaks and by the relative intensities thereof. The noncrystalline phases are not detected by the x-ray diffraction analysis.

The zeolite crystals are ground and then spread and leveled out on a sample holder by simple mechanical compression.

The conditions under which the diffractogram is acquired on the Bruker D5000 machine are as follows:
Cu tube used at 40 kV-30 mA;
slit size (divergent, scattering and analysis slits)=0.6 mm;
filter: Ni;
sample device rotating at: 15 rpm;
measuring range: $3°<2\theta \leq 50°$;
increment: 0.02°;
counting time per increment: 2 seconds.

Interpretation of the diffractogram obtained is performed with the EVA software with identification of the zeolites using the ICDD PDF-2 release 2011 database.

The amount of crystals, by weight, is determined by XRD analysis; this method is also used to measure the amount of noncrystalline phases. This analysis is performed on a Bruker machine, and the amount by weight of the zeolite crystals is then evaluated using the TOPAS software from the company Bruker.

The crystallinity (or degree of crystallinity) corresponds to the ratio of the sum of the weight fractions of the crystalline phases present, relative to the total weight of the sample.

The purity is expressed as a weight percentage of desired crystalline phase relative to the total weight of the sample.

The invention claimed is:

1. A process for synthesizing zeolite X crystals comprising:
   - at least one step of adding seeding agent(s) into a synthesis gel; and
   - at least one step of forming zeolite X crystals at a temperature equal to or greater than 130° C.

2. The process according to claim 1, comprising at least the following steps:
   a) preparing a synthesis gel by mixing at least one source of silica, at least one source of alumina and optionally, at least one aqueous alkali or alkaline-earth metal hydroxide solution,
   b) mixing said synthesis gel with at least one seeding agent in order to obtain a reaction medium,
   c) introducing the reaction medium into a crystallization reactor,
   d) carrying out the crystallization at a temperature equal to or greater than 130° C.,
   e) filtering the reaction medium in order to recover the zeolite X crystals produced.

3. The process according to claim 2, wherein the crystallization temperature is equal to or less than 200° C.

4. The process according to claim 1, wherein the reaction medium is introduced into the crystallization reactor at a temperature equal to or greater than 50° C.

5. The process according to claim 2, wherein the difference between the crystallization temperature and the temperature of the reaction medium (Tc−Tr) is between 0° C. and 100° C., limits included.

6. The process according to claim 1, wherein the zeolite crystals prepared are zeolite X crystals having an Si/Al atomic ratio of between 1.00 and 1.45, limits included.

7. The process according to claim 1, wherein the seeding agent is chosen from nucleating gels, zeolite crystals, mineral particles, and mixtures thereof.

8. The process according to claim 1, wherein the total amount of seeding agent(s) added represents between 0.005% and 10% by weight relative to the synthesis gel.

9. The process according to claim 1, wherein the crystallization reaction is carried out at a pressure between atmospheric pressure and 1.5 MPa.

10. The process according to claim 1, wherein the process is conducted continuously, and wherein the crystallization is carried out in a tubular reactor provided with an oscillatory device.

* * * * *